UNITED STATES PATENT OFFICE.

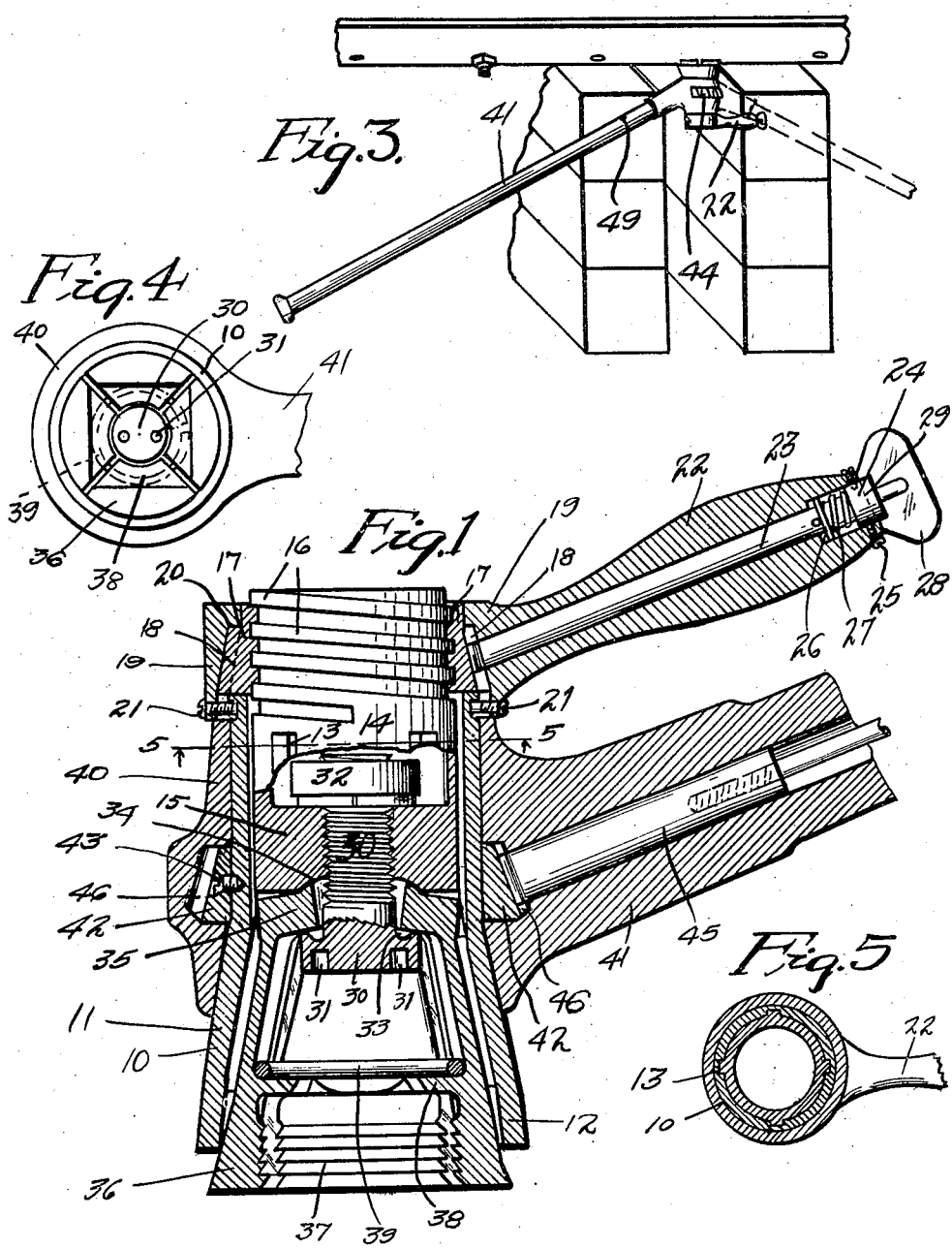

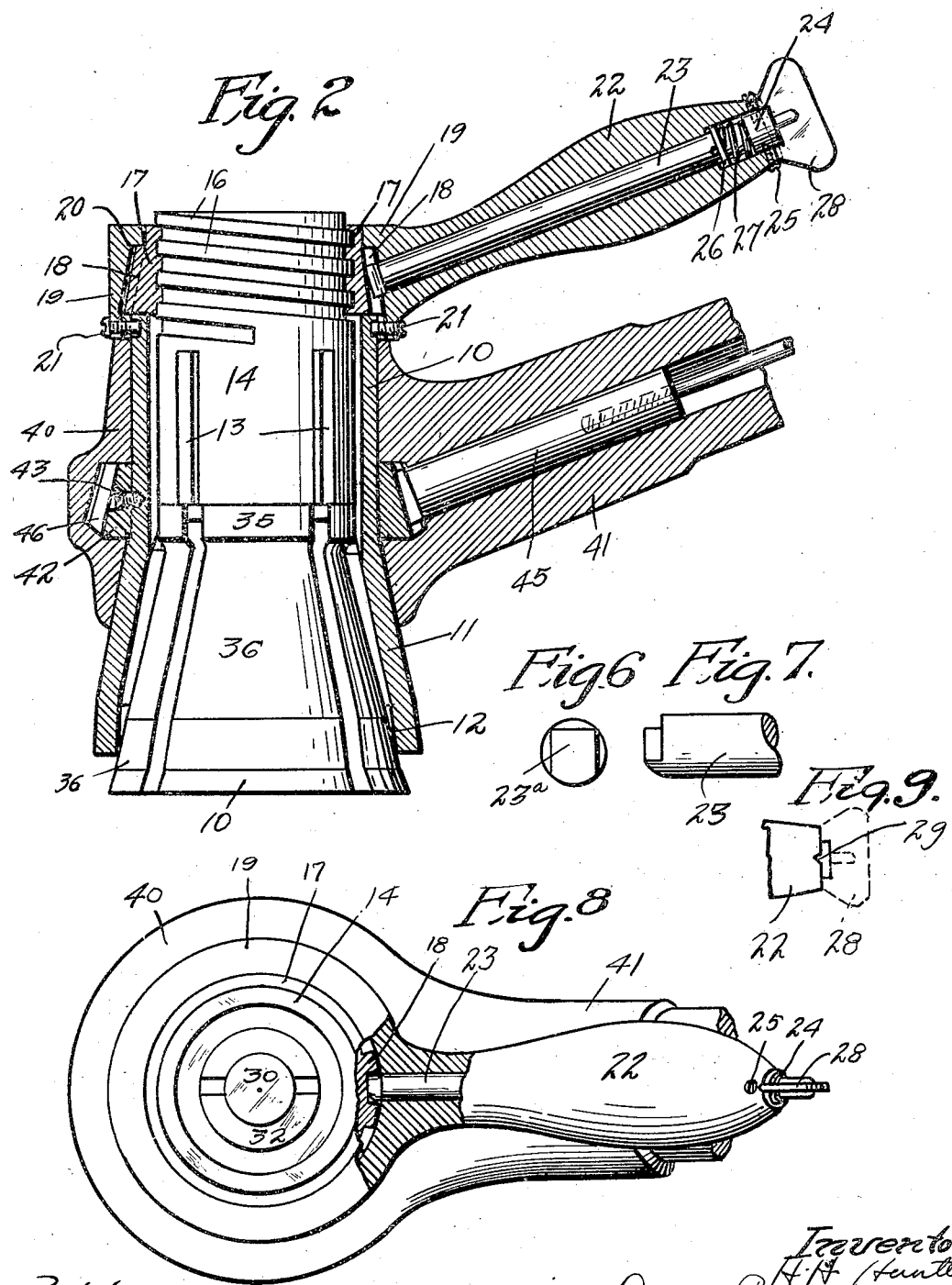

HERBERT H. HUNTER, OF LOS ANGELES, CALIFORNIA.

BOLTER-UP TOOL.

1,402,165.　Specification of Letters Patent.　Patented Jan. 3, 1922.

Application filed January 2, 1920. Serial No. 349,037.

*To all whom it may concern:*

Be it known that I, HERBERT H. HUNTER, a citizen of the United States, and resident of Los Angeles, in the county of Los Angeles and State of California, have invented a certain new and useful Bolter-Up Tool, of which the following is a specification.

My invention consists in certain new and useful improvements in bolter-up tools of the kind ordinarily employed in such work, for instance, as ship building and heavy structural steel constructions, and my object is to provide a tool of this character of simple, durable and inexpensive construction, and so arranged that the nut engaging jaws may be firmly gripped to a nut in such manner that they alone will support the entire tool in position on the nut, and then after the nut is thus gripped, it may be turned either to screw or unscrew it.

More specifically it is my object to provide a device of this kind in which the lever of the nut adjusting jaws, or the lever for turning the nut, may be operated either to tighten or loosen the jaws, or to tighten or loosen the nut, even though the space in which the tool must be operated is quite limited, and the said levers can move only in the small arc of a circle. In other words, it is my object to provide a lever-operated nut gripping tool, and a lever-operated nut turning tool, so constructed and arranged that it may be successfully operated for all of the purposes for which it is intended, even though the space in which the levers must turn consists only of the arc of a circle, such as frequently occurs in bolting up nuts on ships or steel structures.

A further object of my invention is to provide a bolter-up tool, having a novel adjusting device for the jaws and for rotating the head of the tool, which carries the jaws whereby the device, when clamped to a nut will support itself, after being once secured to the nut.

A further object of my invention is to provide a novel device, whereby the jaws may be readily changed to fit nuts of different sizes.

My invention consists in the construction, arrangement and combination, in a tool of the character described, of reversible or releasable lever-operated nut gripping jaws, and a reversible lever-operated nut turning device, whereby the objects contemplated are attained, as hereinafter more fully set forth, pointed out in my claims, and illustrated in the accompanying drawings, in which:

Figure 1 shows a vertical, central, sectional view through the bolter-up tool, the shank which carries the jaws being shown partly only in section, in order to better illustrate the construction.

Figure 2 shows a similar view, whereby the exterior formation of the jaws is illustrated.

Figure 3 illustrates my improved tool secured to a nut, whereby the manner of its use is more clearly illustrated.

Figure 4 is a bottom view of the device.

Figure 5 is a view taken on the line 5—5 of Figure 1.

Figures 6 and 7 are bottom and side view respectively of the ratchet devices removed from the tool, illustrating their construction.

Figure 8 is a top or plan view of the device, parts being broken away to better illustrate the construction; and Figure 9 shows a detail view of the handle member of the ratchet device.

Referring to the accompanying drawings, I have used the reference numeral 10 to indicate a hollow cylindrical shell, having its lower edges flared outwardly at 11, and then again contracted somewhat at 12. The shell 10 has a plurality of grooves disposed around its inner surface, designed to receive the splines 13 of a shank 14. The shank 14 is also substantially of the form of a hollow cylinder, and has an end portion 15 at its lower end, which has a threaded opening therein for a purpose which will hereinafter be described.

From the construction of the parts just described, it will be seen that the shank 14 may be permitted to reciprocate within the shell 10, but may not rotate therein. For causing reciprocation of the shank 14, I provide the following described means: The upper portion thereof has exterior screw-threads 16, which are designed to be received in and coact with a threaded collar 17. The threaded collar 17 is designed to rest upon the upper edges of the shell 10, and is provided with exterior ratchet teeth 18. A second collar 19 is rotatably mounted upon the collar 17 and provided with a shoulder 20, adapted to coact with the tops of the teeth 18 to prevent the collar 17 from moving upwardly.

Adjacent to the lower edges of the collar 19 are a plurality of set screws 21, which are designed to enter an annular groove disposed in the exterior surface of the shell 10, adjacent to its upper edge. It will be understood that any other form of device may be substituted for the set screws 21, such for instance, as a broken annular ring, which may be secured to the collar 19 in any suitable way, and thereby adapted to enter the groove in the shell 10, so that the collar 19 may be rotatably mounted relative to the shell 10.

From the construction of the parts just described, it will be seen that the collar 17 is rotatably mounted within the recesses formed by the collar 19 and the shell 10, but cannot reciprocate, whereby rotation imparted to the collar 17 will cause the threads therein to coact with the threads 16 on the shank 14, thereby causing the latter to reciprocate.

For imparting rotation to the collar 17, I provide the following described mechanism: A handle 22 extends laterally and upwardly from the collar 19, and may, if desired, be formed integral therewith. In the handle 22 is a longitudinal, central opening designed to receive a dog or ratchet 23. The opening in the handle 22 is enlarged at its outer end and a plug 24 is secured in the mouth of said opening in any suitable way, as by set screws 25. The plug 24 has a central opening therein designed to slidably and rotatably receive the ratchet or dog 23. A collar or washer 26 is secured to the ratchet or dog 23 within the enlarged portion of the opening in the handle, and an extensible coil spring 27 extends between the plug 24 and the washer 26. The construction of the end of the ratchet or dog device 23, which engages the teeth 18, is illustrated in Figures 6 and 7, and from the construction there shown, it will be seen that rotation of the dog 23 within the opening in the handle 22 will allow the ratchet to coact with the teeth 18 to permit the ratchet to slide over said teeth in either direction depending upon the position of the tooth 23ª relative to the teeth. A handle member 28 is secured to the end of the dog 23 to cause it to coact with the teeth 18 to move the ring 17 in either direction.

The handle member 22 is notched at 29, whereby it is necessary to pull the handle 28 out of the notch in order to rotate the dog, and which also makes it possible to throw the dog entirely out of engagement with the teeth, by rotating the handle 28 a quarter of a turn, instead of half of a turn.

From the construction of the parts just described, it will be seen that swinging of the handle 22 when the dog 23 is in engagement with the teeth 18 will impart rotation to the collar 17, thereby reciprocating through the threads 16, the shank 14.

Nut engaging jaws are disposed within the shell of my tool and secured to the shank 14 by the following described mechanism:

A bolt 30 is threaded into the opening of the web or end portion 15 of the shank 14 with the head thereof disposed in position spaced from the lower surface of the web 15. Recesses 31 are formed in the head of the bolt 30 in order that the same may be conveniently rotated by means of an appropriate tool. The end of the bolt 30 is engaged by a lock nut 32, whereby it may be held from accidental rotation.

The head of the bolt 30 on its upper surface adjajcent to the bolt has an annular grove 33 therein for a purpose which will hereinafter be described. A similar groove is formed in the lower surface of the web 15 adjacent to the bolt 30 at 34. It will be noted that the space between the head of the bolt and the web 15 is designed to receive laterally extending lugs 35, which are disposed at the top of each of a plurality of nut engaging jaws 36. The inner lower surfaces of these jaws 36 are serrated at 37, in order that they may more strongly engage the side surface of a nut.

A stop or inwardly extending lug 38 on each jaw 36 limits the movement of the nut into the jaws, and also serves as a rest for a broken or split ring spring 39.

From the construction of the parts just described, it will be seen that reciprocation of the shank 14 will reciprocate the head of the bolt 30, thereby drawing the nut engaging jaws into the shell 10 adjacent to the portion 12. Drawing these jaws into the shell will squeeze them together, thereby causing them to tightly engage whatever may be between them.

If the collar 17 be rotated in the opposite direction, then the shank 14 would be pushed downwardly, thereby causing the web 15 to engage the lugs 35, and pushing the jaws out of the shell 10. It will be seen that the split ring spring 39 will tend to open the jaws, as the effect of this spring is to hold the outer surfaces of the jaws against the inner surface of the portion 12 of the shell 10.

From the foregoing, it will be seen that swinging of the handle 22 together with the placing of the ratchet 23 in its proper position will cause rotation of the collar 17, and thereby either open or close the jaws 36.

For rotating the entire tool to thereby rotate the nut or bolt, to which it is secured, I provide the following described mechanism:

Rotatably but non-slidably mounted on the shell 10 is a collar or bar 40, to which is secured the turning handle 41. This handle may be and preferably is formed integral with the collar 40. The collar 40 is provided with an annular groove or recess in the central portion of its inner surface designed to receive a tooth ring 42. This ring is secured to the shell 10 by any suitable means, and I have here shown a set screw 43, which extends through the ring and the shell for accomplishing that purpose.

In this connection, it may be mentioned that in assembling this tool, the ring 42 is inserted through an opening 44 in the collar 40, and then the shell 10 is pushed up into the collar 40 and the ring 42 secured thereto.

The handle 41 is provided with a ratchet or dog 45, which is similar in all respects to the ratchet or dog 23, and the dog 45 coacts with teeth 46 on the ring 42 in the same way that the dog 23 coacts with the teeth 18 on the ring 17. This dog 45 is provided with the same reversing device as is shown in Figures 2 and 9, applied to the dog 23.

It will thus be seen that swinging of the handle 41 and the collar 40 therewith may cause rotation of the shell 10 within the collar 40 in either direction, thereby making it possible to rotate the shell and the nut or bolt upon which the jaws are secured.

In practical use the nut engaging jaws are first placed on the nut to be turned, and then the lever or handle 22 is operated in such a manner as to move the nut engaging jaws upwardly within the body 10, through the instrumentality of the screw 16, until the nut engaging jaws grip the nut sufficiently tight to firmly hold the bolter-up tool in position on the nut.

It is impracticable, in a tool of this character, to tighten the jaws to a nut without the use of a handle or lever. Hence the handle or lever becomes an essential part of the tool. There are, however, many instances in which the tool is used in a place where the handle or lever 22 could not be turned in a complete circle to either tighten the jaws or release them from the nut. For this reason, it is necessary that there be a ratchet connection between the handle or lever 22 and the ratchet collar 17. However, by this arrangement it is possible to either tighten or loosen the jaws even though the space in which the operator may work consists of only the small arc of a circle. Furthermore, after the jaws have been gripped to a nut it is necessary to rotate the jaws in a complete circle in order to screw or unscrew a nut, and if the handle 22 were rigidly secured to the nut engaging jaws, so that it would have to turn with them, the tool could not be operated unless there were room for the handle or lever 22 to turn in a complete circle, and there are many instances in use where there is not sufficient room for this purpose. It is therefore very convenient, in a tool of this kind, to have the ratchet device of the handle or lever 22 so arranged that it may be placed in an inoperative position and there held, and the nut engaging jaws rotated repeatedly in a complete circle without moving the handle or lever 20.

After the device has been firmly clamped to a nut, in the manner described, then the nut is turned to either screw or unscrew it, by a manipulation of the lever 41, and the turning may be done in either direction by reversing the position of the ratchet device carried by the handle 41.

In use it is obvious that there are many times in which the two handles 22 and 41 must move relative to each other, or one of them stand still while the other moves. For this reason, it is desirable that these handles be extended in substantially parallel directions, as otherwise they might interfere with each other, because it is desirable to have them relatively close together.

In the use of my bolter-up tool it has been found not only possible, but convenient, to grip a nut so tightly between the nut engaging jaws as to support the entire weight of the tool in position. Then after the nut is thus gripped it may be turned to tighten or loosen it, as much as may be desired, and all of these operations may be performed conveniently and easily even though the nut is in position where there are such obstructions on one or two sides of it, as would prevent any kind of a bolter-up tool from being applied to the nut, and turned through more than a very small arc of a circle.

The ratchet wrench proper, without a lever-operated nut gripping device, would not be practicable for many purposes for which this bolter-up tool is used, because sufficient power cannot be applied to the nut gripping jaws without the use of a lever, and if a lever is used, it is essential that it be employed in connection with a reversible ratchet device, and it is desirable that the ratchet device at times be held in an inoperative position, so that the head containing the gripping jaws may freely rotate relative to the handle 20. By the use of my improvement, however, the tool may be used in any position where there is room to admit the tool head and also room to swing the two handles through the small arc of a circle.

Parts of the subject-matter of this specification are substantially the same as that disclosed in my copending applications on a mechanical bolter-up tool, filed July 24, 1918, Serial Number 246,486, and on a bolter-up tool, filed November 4, 1919, Serial Number 335,761.

I claim as my invention:

1. In a bolter-up tool; the combination of nut engaging jaws; two levers for operating them; means associated with one of said levers, for causing said jaws to grip or release a nut; and means associated with the other lever, for causing said jaws to turn a nut to tighten or loosen it.

2. In a bolter-up tool; the combination of nut engaging jaws; two levers for operating them; a reversible ratchet device associated with one of said levers, for causing said jaws to grip or release a nut; and a reversible ratchet device associated with the other lever, to cause said jaws to turn a nut to tighten or loosen it.

3. In a bolter-up tool; the combination of nut engaging jaws; two levers for operating them; a reversible and releasable ratchet device associated with one of said levers, for causing said jaws to grip or release a nut, by a movement of the lever, or to permit the lever to move in both directions without operating the jaws; and a reversible ratchet device associated with the other lever, for causing said jaws to turn a nut to tighten or loosen it.

4. In a bolter-up tool; the combination of nut engaging jaws; two levers for operating them, said levers being extended outwardly from the jaws in substantially parallel planes and close together, one above the other, whereby either of said levers may be rotated independently of the other without engaging the other; means associated with one of said levers, for causing said jaws to grip or release a nut; and means associated with the other lever, to cause said jaws to turn a nut to tighten or loosen it.

5. In a bolter-up tool; the combination of nut engaging jaws; a substantially cylindrical head in which said jaws are mounted, said head having its exterior substantially smooth and unobstructed and of a diameter substantially the same as the diameter of the nut engaging jaws, whereby the jaws may be applied to a nut which is close to an obstruction extending outwardly from the article being bolted up; two levers for operating the jaws; a reversible ratchet device associated with one of said levers, for causing the jaws to tighten or loosen, said reversible ratchet device including a grip device for adjusting the ratchet device for reversing it, which grip device is located at the outer end of said lever, and which reversible ratchet device is located wholly within the said lever and the head adjacent to the jaws, and whereby the outer surface of the head at all points except the said lever, is smooth and unobstructed; and a reversible ratchet device associated with the other lever, for rotating said jaws.

6. In a tool; the combination of a head comprising a shell; a set of jaws disposed in the shell and adapted to extend therefrom in certain of their positions; a shank fixed to said jaws and having a threaded end; said shank being slidably but non-rotatably mounted within said shell; a threaded ring engaged with said shank and rotatably but non-slidably mounted on the shell; a ratchet on said threaded ring; a handle having a pawl to engage said ratchet ring; a ratchet ring fixed to said shell; a collar rotatably but non-slidably mounted on said shell; and a dog carried by said collar and adapted to engage said ring.

7. In a tool; the combination of a head comprising a shell; a plurality of jaws disposed adjacent to one end of said shell; a shank slidably but non-rotatably mounted within said shell, said shank having its upper end threaded and a transverse web at its lower end; a bolt extended through said web, whereby said jaws may be mounted between the head of said bolt and said web; a threaded ring adapted to engage said shank rotatably but non-slidably mounted on said shell; means for rotating said ring; and means for rotating said shell.

8. In a tool; the combination of a head comprising a shell, a substantially cylindrical shank rotatably but non-slidably mounted within said shell; said shank having a transverse web at its lower end and a threaded portion at its upper portion; a bolt extended through said web; a plurality of jaws clamped between said web and the head of said bolt; a threaded ring adapted to coact with said shank and rotatably but non-slidably mounted in said shell; means for rotating said ring; and means for rotating said shell.

9. In a tool; a substantially cylindrical shell; a substantially cylindrical shank mounted within said shell, having a transverse web at the lower end thereof; a bolt extended through said web; jaws mounted in said shell and operatively connected with said shank, by having a portion thereof received between the head of said bolt and said web; and means for moving said shank within said shell to thereby contract said jaws.

10. In a tool; a substantially cylindrical hollow shell; a shank comprising a hollow cylindrical portion, having a transverse web at its lower end; a bolt extended through said web; jaws mounted within said shell, and operatively connected with said shank, by having a portion thereof received between the head of the bolt and said web;

means for moving said shank within said shell to contract said jaws; and resilient means adapted to open said jaws.

11. In a device of the class described; a shell comprising a substantially cylindrical member, having a central, laterally, extending ratchet ring mounted thereon, a collar rotatably but non-slidably mounted on the central portion of said shell; a handle extended from said collar; a reversible ratchet device mounted in said collar and adapted to coact with said ratchet ring; a second ratchet ring rotatably but non-slidably mounted on said shell; a collar similarly mounted on said shell adjacent thereto; a reversible ratchet device mounted in said collar and adapted to coact with said second ring; a shank operatively connected with said second ring, whereby rotation of the ring may impart reciprocation to said shank; and jaws operatively connected with said shank, and extended into said shell, whereby reciprocation of said shank may contract said jaws and whereby the jaws may be contracted without moving the shell.

12. In a device of the class described; a shell; a shank comprising a hollow cylindrical device, having a transverse web at its lower end, slidably but non-rotatably mounted within said shank; a plurality of jaws having their upper ends operatively connected with said shank; means for normally, yieldingly opening said jaws; and means for reciprocating said shank, whereby movement of the shank in one direction may draw the jaws into the shell to thereby contract the jaws, and movement of the shank in the opposite direction may push the jaws out of the shell to thereby permit them to be yieldingly separated.

Des Moines, Iowa, November 18, 1919.

HERBERT H. HUNTER.